United States Patent

Shimada et al.

[15] 3,650,658

[45] Mar. 21, 1972

[54] APPARATUS FOR LIFTING, LOWERING AND COMPRESSING THE PUNCHES OF A ROTARY POWDER COMPRESSION MOLDING MACHINE

[72] Inventors: Yasuo Shimada, 104, Minamikamiai-cho, Nishinokyo, Nakakyo-ku; Giichiro Kowada, 3, Inoke-cho, Hanazono, Ukyo-ku, Kyoto, both of Japan

[22] Filed: Apr. 28, 1970

[21] Appl. No.: 32,643

[52] U.S. Cl. .......................... 425/418, 425/DIG. 5, 107/17
[51] Int. Cl. ................................................ B29c 3/02
[58] Field of Search ............... 18/20 C, 20 R, 20 RR, 20 S, 18/20 T, 16.5, 16.7; 107/15 AC, 15 R, 17

[56] References Cited

UNITED STATES PATENTS

| | | | |
|---|---|---|---|
| 3,555,608 | 1/1971 | Maekawa et al | 18/20 RR |
| 2,570,989 | 10/1951 | Seelig | 18/16.5 |
| 1,757,370 | 5/1930 | Kilian | 107/17 UX |
| 2,800,087 | 7/1957 | Kerfoot | 107/17 X |

Primary Examiner—J. Spencer Overholser
Assistant Examiner—Donald M. Gurley
Attorney—George B. Oujevolk

[57] ABSTRACT

Apparatus for lifting, lowering and compressing one of the punches in a rotary powder compression molding machine at an angle which is inclined wherein a rotating cam having an annular groove and rotating to the horizontal is mounted above a punch holding block of a rotary powder compression molding machine. The head of the punch is fitted in the annular groove of the rotating cam, thereby lifting and lowering the punch at least in the part of the punch holding block before and behind the position of compression, and compressing the punch at the position of compression.

3 Claims, 3 Drawing Figures

Patented March 21, 1972

Yasuo Shimada
Giichiro Kawada
Inventor

By George K. Cujevalk
Attorney

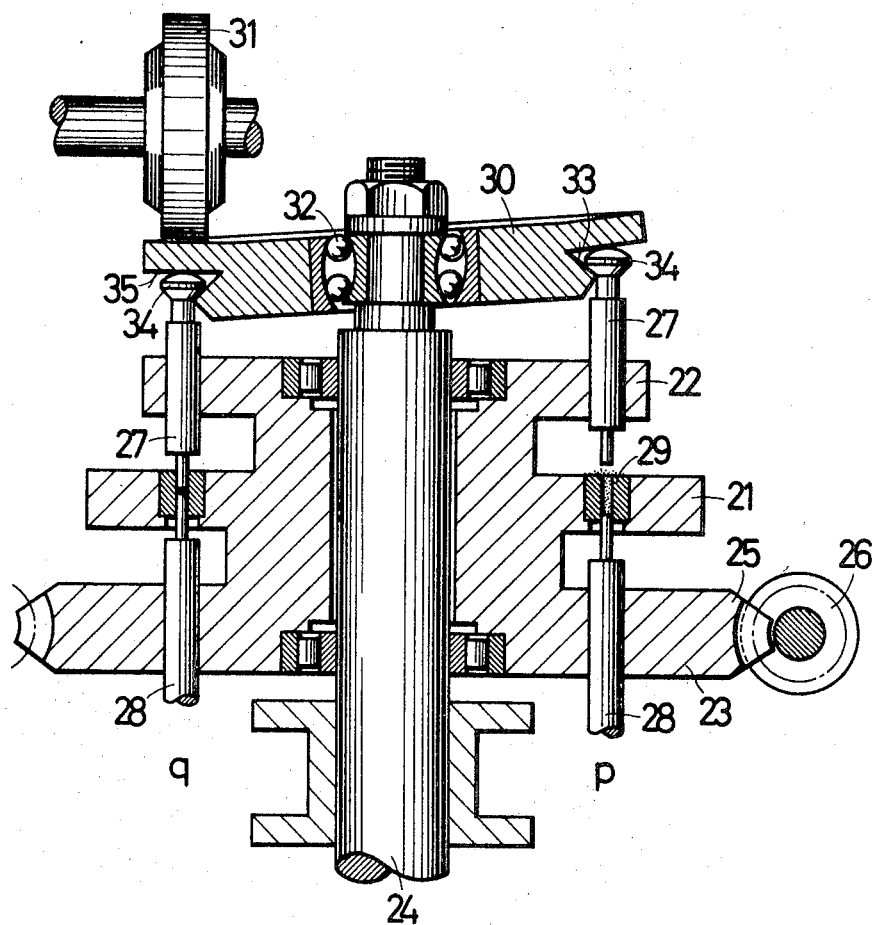

APPARATUS FOR LIFTING, LOWERING AND COMPRESSING THE PUNCHES OF A ROTARY POWDER COMPRESSION MOLDING MACHINE

BACKGROUND OF THE INVENTION

The present invention relates to an apparatus for lifting, lowering and compressing one of the punches in a rotary powder compression molding machine, and more particularly to an apparatus for the sequential lifting, lowering and compressing of the punches wherein by means of a rotating cam one of the punched fitted in the punch holding block is lifted and lowered at least in the part before and behind the position of compression, and is compressed at the position of compression.

BRIEF DESCRIPTION OF THE PRIOR ART

As is well known, the rotary powder compression molding machine is a machine for producing molded goods shaped like medicine tablets, foodstuffs, agricultural chemicals, electrical parts, industrial chemicals, etc. being so designed that each punch is lifted and lowered from above and under a number of dies provided in the turntable, and with the rotation of the turntable the die is filled with powder, which is compressed with the punch, then the molded goods are discharged. This operation is repeated cyclically and thus units of molded goods are produced one after another.

The lower end of the punch, for example, the upper punch of such a molding machine is raised above the level of the turntable containing the die when it is filled with powder, and it must be lowered into the die of the turntable at the time of compression, and be raised again at the time of the discharge of the molded goods.

Hitherto, lifting and lowering of punches have been performed by means of the punch guide rail.

However, conventional apparatuses for lifting and lowering the punches have this drawback that, when high-speed molding is to be performed by increasing the rotational speed of the turntable, the punch cannot be lifted and lowered satisfactorily by the guide rail, and that due to slipping and friction between the punch and the guide rail, wear and noise are caused to both the punch and the guide rail.

Further, with conventional compressing apparatuses, powder is compressed by compressing the head of the punch with the compressing roller which is located at the position of compression, and whose rotary shaft is perpendicular to that of the turntable.

However, these conventional compressing apparatuses have drawbacks that slipping and torsional friction between the punch and the compressing roll cause wear and noise to both of them, and that, because of the short time of contact between them the duration of the compression of the powder is short, with a result that molded goods of superior quality having little capping cannot be obtained.

OBJECTS OF THE INVENTION

The object of this invention is to overcome these drawbacks of the conventional apparatus for lifting, lowering and compressing the punches.

Thus, it is an object of the present invention to provide an apparatus for lifting, lowering and compressing the punches which makes it possible to lift and lower the punches smoothly and eliminate wear and noise when speedy molding is to be performed.

Another object of the present invention is to provide an improved apparatus for lifting, lowering and compressing the punches which can reduce slipping and torsional friction of the punches at the time of compression and eliminate their wear and noises.

A further object of the present invention is to provide an improved apparatus for lifting, lowering and compressing the punches which makes it possible to prolong the duration of powder compression and produce superior quality molded goods with little capping.

A still further object of the present invention is to provide an improved apparatus for lifting, lowering and compressing punches which makes it possible to lift and lower all the punches constantly and successively by mounting a rotating cam on the shaft inserted through the center of the punch holding block.

A still further object of the present invention is to make complete compression of the punch by said rotating cam, by mounting a compressing roll on the rotating cam at the position of compression.

SUMMARY OF THE INVENTION

Briefly, the apparatus for sequentially lifting, lowering and compressing the punches according to this invention has a rotating cam having an annular groove, the cam rotating at an angle inclined to the horizontal, mounted above a punch holding block of a rotary powder compression molding machine, in such a way that the head of a punch fits in said annular groove of said rotating cam, thereby lifting and lowering said punch in that part of the punch holding block at least before and behind the position of compression, and compressing said punch at the position of said punch.

In a preferred embodiment of the invention said rotating cam is mounted, in some cases, on an inclined shaft independent of a shaft inserted through the center of a punch holding block, while in other cases, it is mounted in such a way that it rotates inclined to the shaft inserted through the center of the punch holding block.

Also, the annular groove of the rotating cam is so formed that the head of the punch can fit into the groove smoothly and without forcing.

BRIEF DESCRIPTION OF THE DRAWING

The nature and object of the invention will be more fully apparent from the following detailed description of preferred embodiments thereof, taken in connection with the accompanying drawings in which:

FIG. 3 is a vertical sectional view showing roughly a modified form of the apparatus for lifting, lowering and compressing the punch according to the present invention.

Referring to FIG. 1 and FIG. 2, a turntable 1 and a punch holding block 2 are formed in one piece, through the center of both of which a shaft 3 is inserted in such a way that they can rotate freely.

Figure 1:
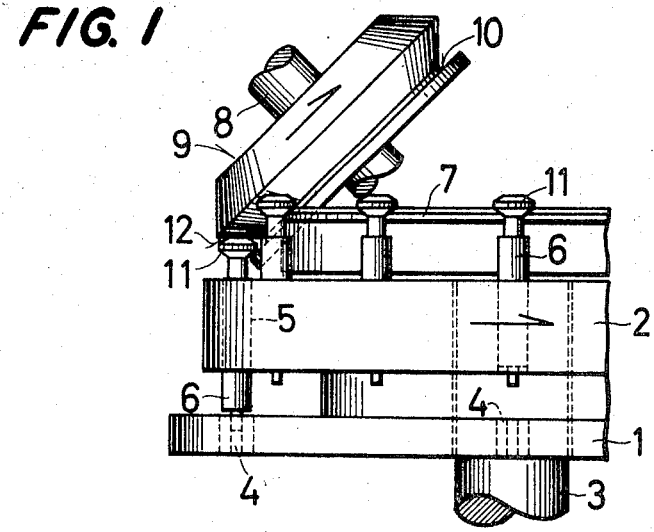
FIG. 1 is an elevation showing roughly a form of the apparatus for sequentially lifting, lowering and compressing punches according to the present invention.
Figure 2:
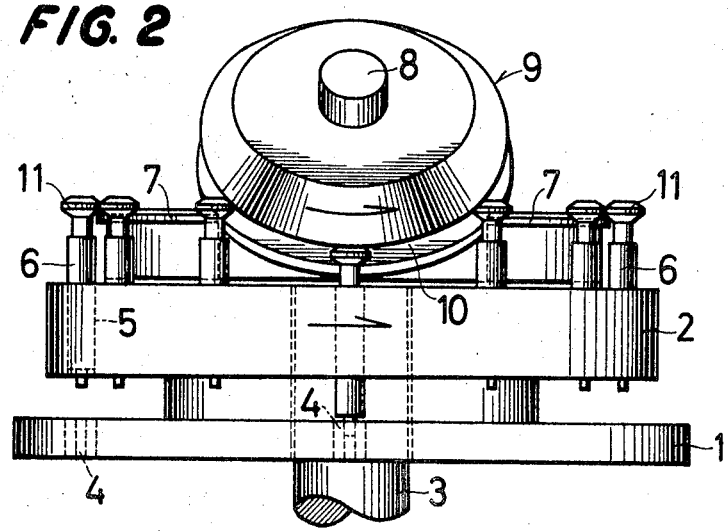
FIG. 2 is a side elevation of the apparatus for sequentially lifting, lowering and compressing punches.

Said turntable 1 has a number of dies 4 properly spaced, and in said punch holding block 2 vertically above each die is formed hole 5 and in said hole 5 is inserted a punch 6.

On said punch holding block 2 are located a punch guide rail 7 that guides said punch 6 at proper height and a rotating cam 9 which is mounted on an inclined shaft 8 and rotates, inclined to the horizontal.

Said rotating cam 9 has an annular groove 10, into which the heads 11 of punches 6 can enter smoothly and without force at the position of compression and in the part of the apparatus before and behind the point of compression. The guide rail 7 begins and terminates at the annular groove 10 of the cam 9.

The apparatus being thus constructed, when the turntable 1 and the punch holding block 2 rotate, the head 11 of one of the punches 6 which has been guided along to the rotating cam 9 by the punch guide rail 7 fits in the annular groove 10 of the rotating cam 9, and is lowered, making a rolling contact with the annular groove 10. With the lowering of punch 6, powder that fills the die 4 of the turntable 1 is compressed harder and harder by the end of the punch 6, and the duration of powder compression is long.

Rotating cam 9 has a downward-facing surface 12 defining the upper wall of the annular groove 10. This wall is so inclined to the shaft 8 that, as shown on the left side of FIG. 1, at the position of maximum compression, i.e., along a line defining the lowest position of this wall, the wall is horizontal, and by this the punch 6 that has been moved to this position is precisely compressed, and the punch 6 rises while making rolling contact, because the punch is held in the annular groove 10 of the rotating cam 9 when it comes to a specified height, it moves from the rotating cam 9, as it is guided by the guide rail 7 and by the rotation of the turntable 1. This operation is repeated cyclically.

Another embodiment of the apparatus for sequentially lifting, lowering and compressing the punches of the present invention is illustrated in FIG. 3 of the drawings.

Referring to FIG. 3, a turntable 21, an upper-punch holding block 22 and a lower punch holding block 23 are formed in one piece, and through these pieces a shaft 24 is inserted so that they can be rotated freely.

The turntable 21, etc. is rotated at a uniform speed by a worm wheel 25 formed along the periphery of said lower punch holding block 23 meshing with a worm 26 driven by the prime mover.

Through said upper punch holding block 22 are inserted a number of upper punches 27 at proper intervals, and likewise through said lower punch holding blocks are inserted a number of lower punches 28.

Turntable 21 has a number of dies 29, and from above and under said dies 29 are inserted the ends of said upper punches 27 and lower punches 28.

Above upper punch holding block 22 a rotating cam 30 and a compressing roll 31 is located.

Rotating cam 30 is mounted on the upper portion of shaft 24 in such a way that it rotates inclined to the horizontal by means of the self-aligning ball bearing 32.

As the prior art teaches how to make said rotating cam rotate at a certain angle of inclination to the horizontal. A detailed description of this feature is omitted, (for instance, it can be easily done by providing several rotating rollers in contact with both the upper surface and the lower surface of the rotating cam).

Said rotating cam 30 has an annular groove 33, into which the head 34 of upper punch 27 fits smoothly without force.

Compressing roll 31 is placed on rotating cam 30 just at the position of compression, and the compressing force of this compressing roll 31 can make complete the compression of the punch by said rotating cam 30.

The apparatus being thus constructed, when the worm 26 is driven, the lower punch holding block 23, turntable 21 and upper punch holding block 22 rotate around the shaft 24 by means of the worm wheel 25 formed along the periphery of the lower punch holding block 23 that meshes with the worm 26.

In this case, the head 34 of the upper punch 27 is lowered from the highest position $p$ to the lowest position $q$ while making rolling contact, guided by the annular groove 33 of the rotating cam 30.

When the upper punch 27 approaches the lowest position $q$, the head 34 of the upper punch 27 is compressed by the downward surface 35 of the annular groove 33 of the rotating cam 30, and compresses harder and harder the powder which fills the die 29 of the turntable 21 with the end of the upper punch 27.

Next, the upper punch 27, after reaching the lowest position $q$, namely the position of maximum compression, rises gradually till it reaches the highest position $p$, then moves back to the lowest position $q$, and repeats such operation cyclically with the rotation of the turntable 21.

Although the invention has been particularly shown and described, it is contemplated that various changes and modification may be made without departing from the scope of the invention as set forth in the following claims.

Thus, for example, apparatus for sequentially lifting, lowering and compressing the punches according to this invention can be utilized not only as an apparatus for lifting, lowering and compressing the upper punches like a preferred embodiment of the invention, but also as an apparatus for sequentially lifting, lowering and compressing the lower punches.

We claim:

1. In an apparatus for sequentially lifting, lowering and compressing individual elongated punches (6, 27) of a rotary powder compression molding machine, wherein a series of punches (6, 27) are disposed around a rotating punch holding block (2, 23) normal to the plane of rotation of said block, and are to be depressed at a workstation to enter a die (4, 29) to compact powder therein, the improvement therein comprising in combination:

a. a rotatable cam means (9, 30) disposed for rotation in a plane which is at an angle to the plane of rotation of said block (2, 23), said cam means having a peripheral groove (10, 33) with an upper wall (12, 35) disposed at an angle to the axis of rotation of said cam means, the angle being such that at the lowest point of rotation of said cam means said upper wall (12, 35) is substantially parallel to the plane of rotation of said block; and, b. a head (11,34) on each of said punches, disposed to enter said groove at least at the time when said punches approach said workstation, whereby each of said punches is sequentially lifted out of the die while in said groove and travels around said block, said groove rotation forcing said head and the corresponding punch down into said die, and again lifting said punch out of said die repeating the cycle.

2. An apparatus as claimed in claim 1, said cam means being a circular cam (9), said cam being disposed over said workstation, a guide (7) extending partly around said block (2) disposed to contact said heads (11) and guide said heads into said groove (10), said guide beginning and terminating at said groove, said head passing onto said guide as it is raised to the level of said guide by said cam rotation, said guide engaging each punch head until said punch head again comes into contact with said groove near said workstation.

3. An apparatus as claimed in claim 1, said cam means being a disk-like plate, said groove constantly engaging said heads of said punches and, a compressing roll (31) disposed over said workstation forcing said punch into the die (29).

* * * * *